US012657362B2

(12) United States Patent
Hong et al.

(10) Patent No.: US 12,657,362 B2
(45) Date of Patent: Jun. 16, 2026

(54) METHOD OF OBTAINING AN INITIAL GUESS FOR A SEMICONDUCTOR DEVICE SIMULATION

(71) Applicant: Gwangju Institute of Science and Technology, Gwangju (KR)

(72) Inventors: Sung Min Hong, Gwangju (KR); Kwang-Woon Lee, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 666 days.

(21) Appl. No.: 18/134,304

(22) Filed: Apr. 13, 2023

(65) Prior Publication Data

US 2024/0078367 A1 Mar. 7, 2024

(30) Foreign Application Priority Data

Aug. 27, 2022 (KR) ........................ 10-2022-0107996

(51) Int. Cl.
| | |
|---|---|
| *G06F 30/3308* | (2020.01) |
| *G06F 17/11* | (2006.01) |
| *G06F 30/23* | (2020.01) |
| *G06F 30/27* | (2020.01) |
| *G06F 30/3323* | (2020.01) |

(Continued)

(52) U.S. Cl.
CPC ........ *G06F 30/3308* (2020.01); *G06F 11/261* (2013.01); *G06F 17/11* (2013.01);
(Continued)

(58) Field of Classification Search
CPC ...... G06F 30/3308; G06F 30/27; G06F 30/23; G06F 30/3323; G06F 30/367;
(Continued)

(56) References Cited

U.S. PATENT DOCUMENTS 5,966,527 A * 10/1999 Krivokapic ........... G06F 30/367
703/14
6,327,555 B1 * 12/2001 Shimizu .................. G06F 30/23
703/2

(Continued)

FOREIGN PATENT DOCUMENTS

JP 2000269105 A * 9/2000
JP 2003502736 A * 1/2003 ........... G06F 30/367

(Continued)

OTHER PUBLICATIONS

"Electrons and Holes in Semiconductors", Hu_ch01v4.fm, University of California Berkeley, https://www.chu.berkeley.edu/wp-content/uploads/2020/01/Chenming-Hu_ch1-3.pdf, Feb. 12, 2009, 34 pages. (Year: 2009).*

(Continued)

*Primary Examiner* — Phallaka Kik
(74) *Attorney, Agent, or Firm* — CANTOR COLBURN LLP

(57) ABSTRACT

Provided is a method for generating an initial guess for simulating a semiconductor device. The method includes; (a) setting 1D direction for a 3D semiconductor device to be simulated and 2D cross sections perpendicular to the 1D direction; (b) setting a charge intensity-gate voltage model for the 2D cross sections; (c) numerically solving an electron or hole continuity equation along the 1D direction to detect integrated electron charge density and quasi-Fermi potential for the 2D cross sections; and (d) calculating a physical quantity for each position of the 2D cross sections by applying the integrated electron charge density and the quasi-Fermi potential for the 2D cross sections to the charge density-gate voltage model, and providing the calculated physical quantity as the initial guess for the semiconductor device simulation. Therefore, the initial solution according (Continued)

START

Set a 1D direction for a 3D semiconductor device to be simulated, and 2D cross sections in a direction perpendicular to the 1D direction — S200

Set a charge density - gate voltage model to be applied to the 2D cross sections — S210

Detect the integrated electron charge density and the quasi-Fermi potential for electrons or holes in 2D cross sections along the 1D direction using a pseudo 1D model — S220

Detect the potential distribution of the 2D cross sections by applying the detected integrated electron charge density and the quasi-Fermi potential of each 2D cross section — S230

Obtain physical quantities for all points of 3D structure of the semiconductor device — S240

Provide the physical quantities as an initial guess for the semiconductor device simulation — S250

END to the present invention can accelerate the speed of the semiconductor device simulation.

8 Claims, 5 Drawing Sheets

(51) Int. Cl.

| | |
|---|---|
| *G06F 30/367* | (2020.01) |
| *G06F 30/398* | (2020.01) |
| G06F 11/26 | (2006.01) |
| G06F 119/06 | (2020.01) |
| G06F 119/18 | (2020.01) |
| G06F 119/22 | (2020.01) |

(52) U.S. Cl.
CPC .............. *G06F 30/23* (2020.01); *G06F 30/27* (2020.01); *G06F 30/3323* (2020.01); *G06F 30/367* (2020.01); *G06F 30/398* (2020.01); *G06F 2119/06* (2020.01); *G06F 2119/18* (2020.01); *G06F 2119/22* (2020.01)

(58) Field of Classification Search
CPC ............... G06F 30/398; G06F 2119/06; G06F 2119/18; G06F 2119/22; G06F 11/261; G06F 17/11
USPC ...... 716/106, 111, 132, 136, 51, 54; 703/14, 703/2; 714/732, 741
See application file for complete search history.

(56) References Cited

U.S. PATENT DOCUMENTS

| | | | | |
|---|---|---|---|---|
| 2001/0007143 A1* | 7/2001 | Wakita | .................... | H10P 74/23 |
| | | | | 716/136 |
| 2003/0101037 A1* | 5/2003 | Kusunoki | .............. | G06F 30/23 |
| | | | | 703/14 |
| 2008/0244477 A1* | 10/2008 | Miura | .................... | G06F 30/367 |
| | | | | 716/136 |
| 2010/0169061 A1* | 7/2010 | Enda | ........................ | G06F 30/23 |
| | | | | 703/2 |
| 2011/0178778 A1* | 7/2011 | Tsai | ....................... | G06F 30/398 |
| | | | | 703/2 |
| 2016/0342719 A1* | 11/2016 | Reid | ........................ | G06F 30/20 |
| 2018/0095936 A1* | 4/2018 | Bonnecaze | ............. | G06F 30/20 |
| 2018/0121587 A1* | 5/2018 | Monga | .................. | G06F 30/367 |

FOREIGN PATENT DOCUMENTS

| | | | | | | |
|---|---|---|---|---|---|---|
| JP | 2003163347 | A | * | 6/2003 | ............. | G06F 30/23 |
| JP | 2005086114 | A | * | 3/2005 | ........... | G06F 30/367 |
| JP | 2010157597 | A | | 7/2010 | | |
| JP | 5416966 | B2 | * | 2/2014 | ............. | G06F 30/23 |
| JP | 2015191379 | A | * | 11/2015 | | |
| KR | 20150087725 | | | 7/2015 | | |
| KR | 20210066545 | | | 6/2021 | | |
| KR | 20220029354 | A | * | 3/2022 | ......... | G01R 31/2601 |

OTHER PUBLICATIONS

"Lecture 8- Carrier Drift and Diffusion, Carrier Flow", Integrated Microelectronic Devices, Feb. 21, 2007, 16 pages. (Year: 2007).*

He et al., Chinese Patent Document No. CN-114398767-A, published Apr. 26, 2022, 3 pages including abstract, claims and 1 drawing. (Year: 2022).*

Lee et al., Derivation of a Universal Charge Model for Multigate MOS Structures With Arbitrary Cross Sections, IEEE Transactions on Electron Devices, Jun. 2022, vol. 69, No. 6, pp. 3014-3021.

\* cited by examiner

FIG. 2

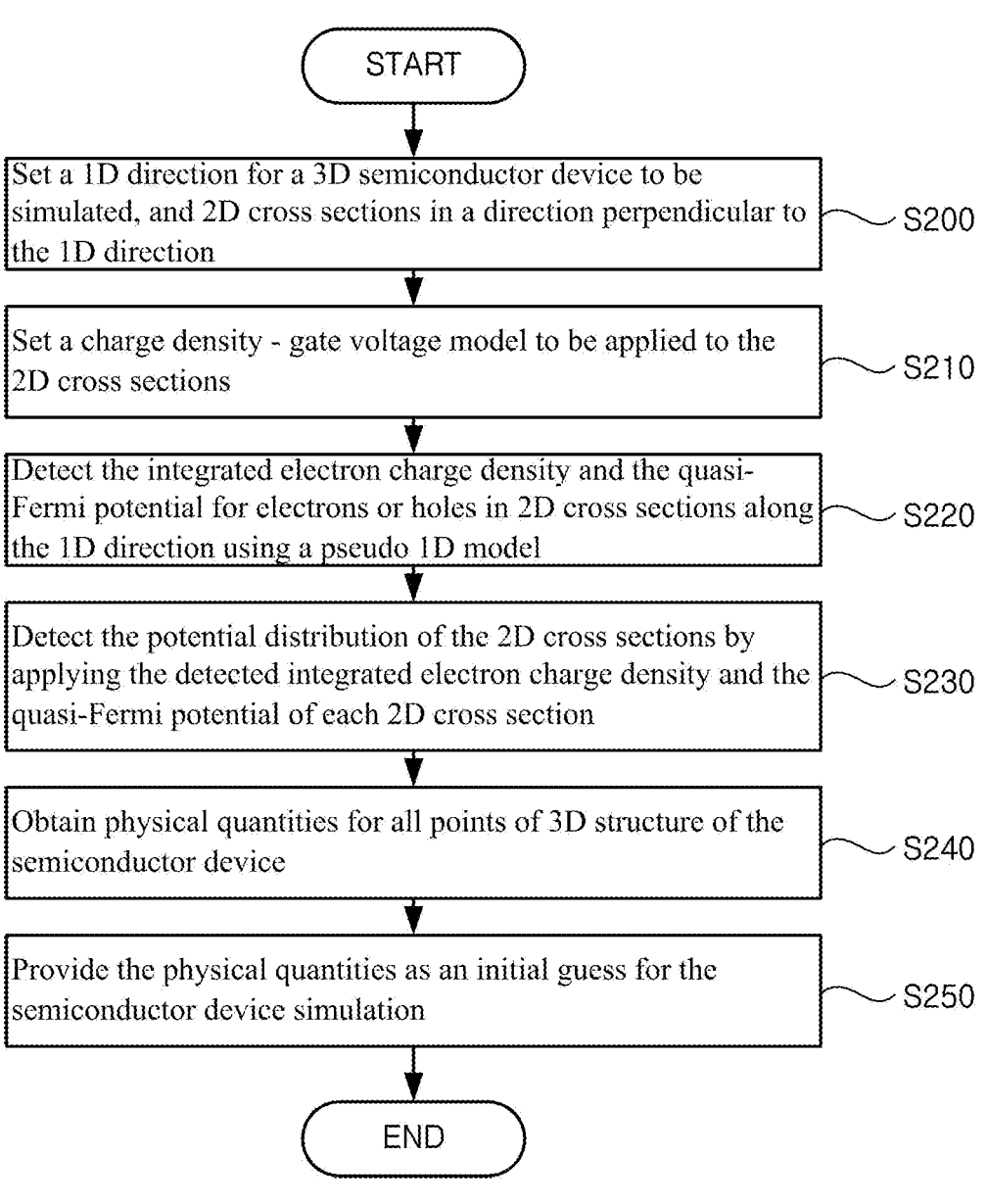

START

Set a 1D direction for a 3D semiconductor device to be simulated, and 2D cross sections in a direction perpendicular to the 1D direction — S200

Set a charge density - gate voltage model to be applied to the 2D cross sections — S210

Detect the integrated electron charge density and the quasi-Fermi potential for electrons or holes in 2D cross sections along the 1D direction using a pseudo 1D model — S220

Detect the potential distribution of the 2D cross sections by applying the detected integrated electron charge density and the quasi-Fermi potential of each 2D cross section — S230

Obtain physical quantities for all points of 3D structure of the semiconductor device — S240

Provide the physical quantities as an initial guess for the semiconductor device simulation — S250

END

METHOD OF OBTAINING AN INITIAL GUESS FOR A SEMICONDUCTOR DEVICE SIMULATION

TECHNICAL FIELD

The present invention relates to a method for generating an initial guess for a semiconductor device simulation. More specifically, the method for generating an initial guess is configured to solve the electron or hole continuity equation for channel direction by applying a pseudo 1D model, and obtain the physical values for all positions in the 3D space of the semiconductor device to provide the obtained values as the initial guesses.

BACKGROUND ART

The semiconductor device simulation is a technology for predicting the performance of a semiconductor device using a computer program, and is essential to reduce time and cost in the semiconductor device development process. The semiconductor device simulator that performs the semiconductor device simulation is a numerical analysis program which calculates and outputs the electrical characteristics of the semiconductor device by solving the governing equations representing the movement of electrons and holes inside the semiconductor device in a numerical way. The electrical characteristics of the semiconductor device output by the semiconductor device simulator typically include an I-V characteristic relationship. Since the governing equations considered in semiconductor device simulation are nonlinear, a complete solution cannot be obtained at once. For this reason, the semiconductor device simulator first assumes an approximate solution as an initial guess, and obtains a complete solution by iteratively improving the solution in the direction of reducing the error caused by the assumed initial guess.

Since the simulation process by the semiconductor device simulator solves a nonlinear equation, it is necessary to know an excellent approximate solution close to the accurate solution. However, since it is difficult to know in advance a good approximate solution to the voltage condition that the user wants to know, inevitably, the final solution is repeatedly obtained while ramping the voltage step-by-step from the initial setting value. Therefore, most of the execution time of the semiconductor device simulation is spent calculating the solution of this intermediate process. Although techniques such as using parallel computing are applied to reduce the execution time of semiconductor device simulation, a huge amount of computing resources are required overall.

Generally, the conventional semiconductor device simulator calculates electrical characteristics at a desired target voltage while gradually ramping an applied voltage from an equilibrium state. In order to avoid the above-described intermediate process, various efforts are being made to immediately generate an initial guess at a desired target voltage.

Meanwhile, a compact charge model is a model that obtains currents of all terminals in a state in which voltages of all terminals are given for a specific semiconductor device. Therefore, the compact charge model represents a terminal current according to a terminal voltage with respect to the specific semiconductor device as a simple equation. These compact charge models are generated and distributed by a research group that specializes in developing compact charge model for each semiconductor device. And, the user can design the current-voltage characteristics for the specific semiconductor device well by matching the parameters of the compact charge model well. For example, in the compact charge model, when information such as the channel length (L), channel width (W), oxide film thickness, and doping of the MOSFET is input, the drain saturation current ($I_D$) according to the gate voltage can be calculated as shown in the following equation.

$$I_D = \frac{1}{2}\mu_n C_{ox}\frac{W}{L}(V_{GS} - V_{TH})^2 \qquad \text{[Equation 1]}$$

Here, $\mu_n$ is the mobility of electrons, $C_{ox}$ is the capacitance of the gate insulating film, $V_{GS}$ is the voltage between the gate and source, and $V_{TH}$ represents the threshold voltage. Of course, the above example is a very simple case, but even in a more complex actual compact charge model, the complexity of the equation only increases, and a mesh is not introduced as in the case of semiconductor device simulation. Therefore, it is possible to calculate the terminal current much more efficiently using the compact charge model. As a result, by using the compact charge model, it is possible to analyze a large circuit consisting of a large number of elements without unreasonableness.

In this way, the compact charge model calculates and provides values at each terminal of the semiconductor device. For examples, the values may include terminal voltage, terminal current, and capacitance of terminals.

FIGS. 1A and 1B are a perspective view and a two-dimensional (2D) cross-sectional view of a transistor exemplarily shown to explain a compact charge model according to the prior art. As shown in FIGS. 1A and 1B, the compact charge model establishes a charge density-gate voltage model in consideration of the 2D cross section shape shown in FIG. 1B in order to calculate the integrated electron charge density by the function of gate voltage in this 2D cross section.

Characteristics at each terminal of the semiconductor device can actually be determined by physical quantities at each point of the semiconductor device. For example, the drain current of a semiconductor device is a value determined by the electron or hole density and the electrostatic potential distribution at all positions from the source to the drain.

The compact charge model integrates the electron or hole continuity equation along the channel direction (i.e., the z-axis direction in FIG. 1A) to obtain the terminal current by using the charge density-gate voltage model set according to the shape of the two-dimensional cross section. In this integration process, the compact charge model has a problem in that information on physical quantities according to each position of the channel is lost.

SUMMARY OF THE INVENTION

An object of the present invention to solve the above problems is to provide a method of generating an initial solution for the semiconductor device simulation, which the method is configured to provide the initial guesses for physical quantities at all positions in a 3D space of a semiconductor device using a pseudo 1D model.

The method of generating an initial solution for the semiconductor device simulation according to an aspect of the present invention for achieving the above technical challenges is comprising the following steps; (a) setting one-dimensional (1D) direction for a three-dimensional (3D) semiconductor device to be simulated, and setting two-dimensional (2D) cross sections perpendicular to the 1D direction; (b) setting a charge intensity-gate voltage model for the 2D cross sections; (c) numerically solving an electron or hole continuity equation along the 1D direction to detect integrated electron charge density and quasi-Fermi potential for the 2D cross sections along the 1D direction; and (d) calculating a physical quantity for each position of the 2D cross sections by applying the integrated electron charge density and the quasi-Fermi potential for the 2D cross sections to the charge density-gate voltage model, and providing the calculated physical quantity as the initial guess for the semiconductor device simulation, wherein the physical quantity for the 3D semiconductor device is provided as the initial guess.

In the method of generating an initial solution for the semiconductor device simulation according to the aspect described above, it is preferable that the 1D direction is a longitudinal direction of a channel of the semiconductor device, and the 2D cross sections are cross sections of the channel in the longitudinal direction of the channel.

In the method of generating an initial solution for the semiconductor device simulation according to the aspect described above, it is preferable that the physical quantity includes an electrostatic potential, a concentration of electrons or holes, or both an electrostatic potential and a concentration of electrons or holes.

In the method of generating an initial solution for the semiconductor device simulation according to the aspect described above, it is preferable that the charge intensity-gate voltage model is determined according to a structure of the 2D cross section, a shape of the channel provided on the 2D cross section, or the type of the 3D semiconductor device.

The method for generating an initial solution according to the present invention having the above configuration can obtain physical quantities at all positions of the 3D semiconductor device and provide them as the initial guesses. In particular, the aforementioned physical quantities include the electrostatic potential and/or the electron or hole concentration.

As a result, the 3D semiconductor device simulation can be provided physical quantities of all positions in the 3D space as the initial guesses, thereby accelerating the simulation speed.

BRIEF DESCRIPTION OF THE DRAWINGS

FIG. 2 is a flowchart sequentially illustrating a method for generating an initial guess for simulating a semiconductor device according to a preferred embodiment of the present invention.

DETAILED DESCRIPTION

Figure 1A:
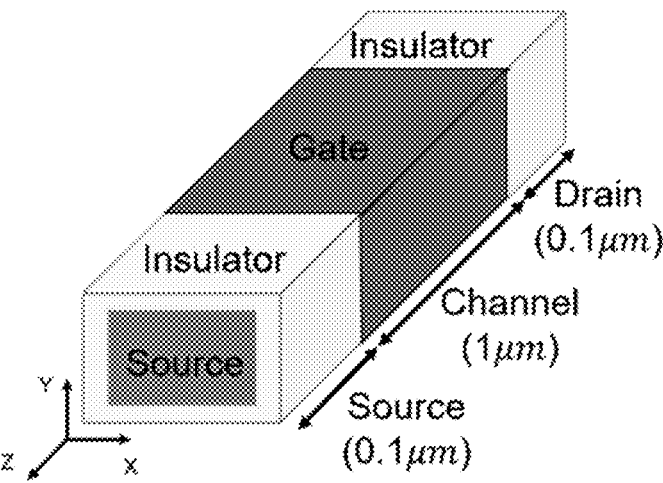
FIGS. 1A and 1B are a perspective view and a two-dimensional cross-sectional view of a transistor exemplarily shown to explain a compact charge model according to the prior art.
Figure 1B:
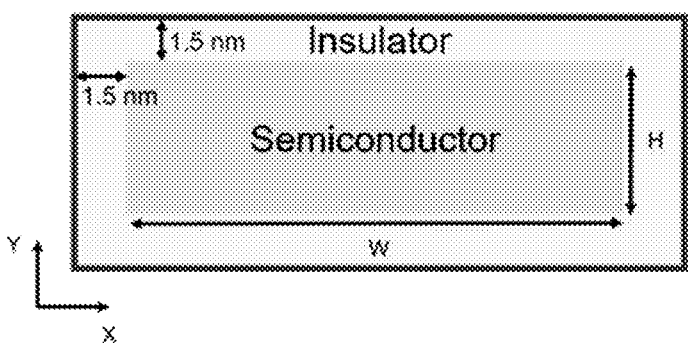

Since the above-described conventional compact charge model only aims at calculating the current at each terminal during the derivation process, the corresponding relationship between the electrostatic potential and the electron/hole concentration at each position of the semiconductor device having a 3D structure is not taken into consideration. Because of this, the compact charge model calculates and provides values only at terminals of the semiconductor device. As a result, values according to changes in physical quantities at each point in the 3D space of the semiconductor device cannot be provided. Therefore, it is not possible to obtain an initial guess for simulating the semiconductor device using the aforementioned compact charge model as it is. However, if many simplification processes introduced in the process of deriving the compact charge model are skipped to maintain the information on each position, it will be possible to obtain the initial guess for the semiconductor device simulation.

On the other hand, the present invention is characterized in that numerically solves the electron or hole continuity equation along the one dimensional (1D) channel direction using a pseudo 1D model to obtain physical quantities for each position in the 3D internal space of the 3D semiconductor device, and provides the obtained physical quantities as the initial guesses for the semiconductor device simulation.

Hereinafter, the method for generating an initial guess for simulating a semiconductor device according to the preferred embodiment of the present invention will be described in detail with reference to the accompanying drawings.

FIG. 2 is a flowchart sequentially illustrating the method for generating an initial guess for simulating a semiconductor device according to the preferred embodiment of the present invention. Referring to FIG. 2, in the method for generating the initial guess according to the present invention, at first, a 1D direction is set for a 3D semiconductor device to be simulated, and 2D cross sections are set in a direction perpendicular to the 1D direction (step 200). Here, the 1D direction is preferably a longitudinal direction of a channel of the semiconductor device. Accordingly, the starting point (z=0) in the 1D direction may be an end point of the channel adjacent to the source of the semiconductor device, and the last point (z=L) in the 1D direction may be an end point of the channel adjacent to the drain. In addition, it is preferable that the 2D cross-sections are cross-sections for each position of the channel of the semiconductor device. Accordingly, a silicon channel exists in the 2D cross section.

Next, a charge density-gate voltage model to be applied to the 2D cross sections is set (step 210). The charge density is an integrated electron charge density. The charge density-gate voltage model is a model representing a change in charge density in a 2D cross section according to a gate voltage applied to the gate of the semiconductor device. The charge density-gate voltage model may be variously determined according to a structure of the 2D cross section in the 1D channel direction, a shape of the channel provided in the 2D cross section, or a type of the 3D semiconductor device.

Next, by applying a pseudo 1D model, the electrons or holes continuity equation along the 1D direction is numerically solved to detect the integrated electron charge density and the quasi-Fermi potential for electrons or holes in 2D cross sections along the 1D direction (step 220).

Next, the potential distribution of the 2D cross sections is detected by applying the detected integrated electron charge density and the quasi-Fermi potential of each 2D cross section to the charge density-gate voltage model preset for the 2D cross section (step 230).

Next, physical quantities for all points of all 2D cross-sections located along the 1D direction are obtained from the potential distribution of the 2D cross-sections along the 1D direction (step 240). Here, the physical quantity may include electrostatic potential, electron or hole concentration, or both electron/hole concentration and electrostatic potential. The physical quantities obtained through the above process are provided as an initial guess for the semiconductor device simulation (step 250).

According to the method for generating an initial guess according to the present invention, it is possible to provide the physical quantities for all positions of a semiconductor device having a 3D structure in a 3D space as the initial guess for the semiconductor device simulation.

Figure 3:
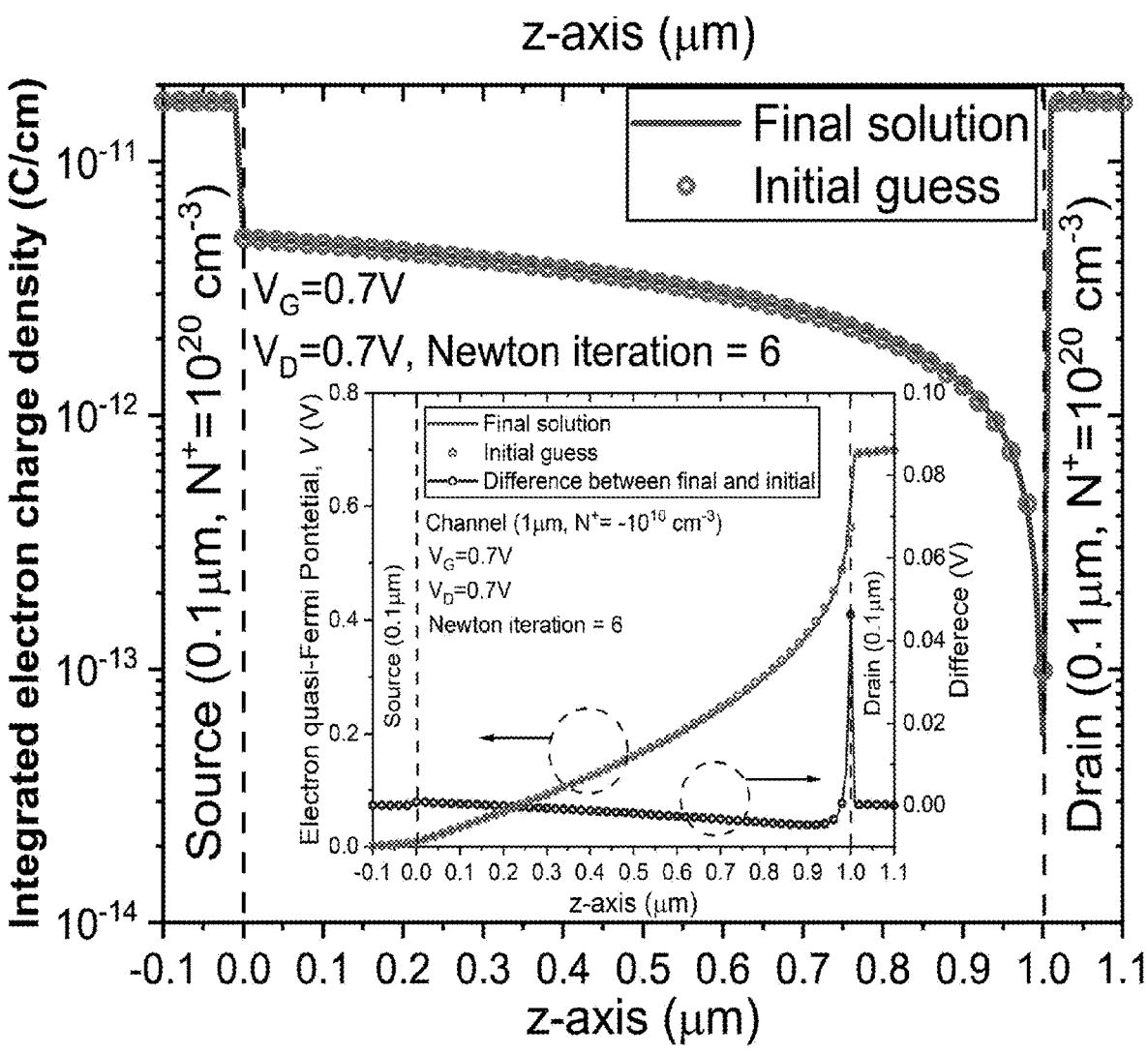
FIG. 3 are graphs showing the integrated electron charge density and the electron quasi-Fermi potential, respectively, obtained using the pseudo 1D model according to the preferred embodiment of the present invention.

FIG. 3 are graphs showing the integrated electron charge density and the electron quasi-Fermi potential, respectively, obtained using the pseudo 1D model according to the preferred embodiment of the present invention. As shown in FIG. 3, the integrated electron charge density and the electron quasi-Fermi potential can be obtained by solving the electron or hole continuity equation along the 1D channel direction using the pseudo 1D model according to the present invention. In FIG. 3, the larger graph shows the integrated electron charge density, and the smaller graph inside shows the electron quasi-Fermi potential. In the graphs of FIG. 3, what is represented by a circle is the initial guess obtained based on the results of the pseudo 1D model according to the present invention. And, what is represented by the solid black line is the final solution of the electron concentration and quasi-Fermi level obtained again using the converged solution which is obtained by 3D device simulation using the initial guess.

Referring to FIG. 3, as a result of comparing and examining the initial guess according to the present invention and the final solution obtained using the converged solution, it can be seen that the results are very similar. Therefore, it can be seen that the initial guess generated using the pseudo 1D model according to the present invention is a very good.

Figure 4:
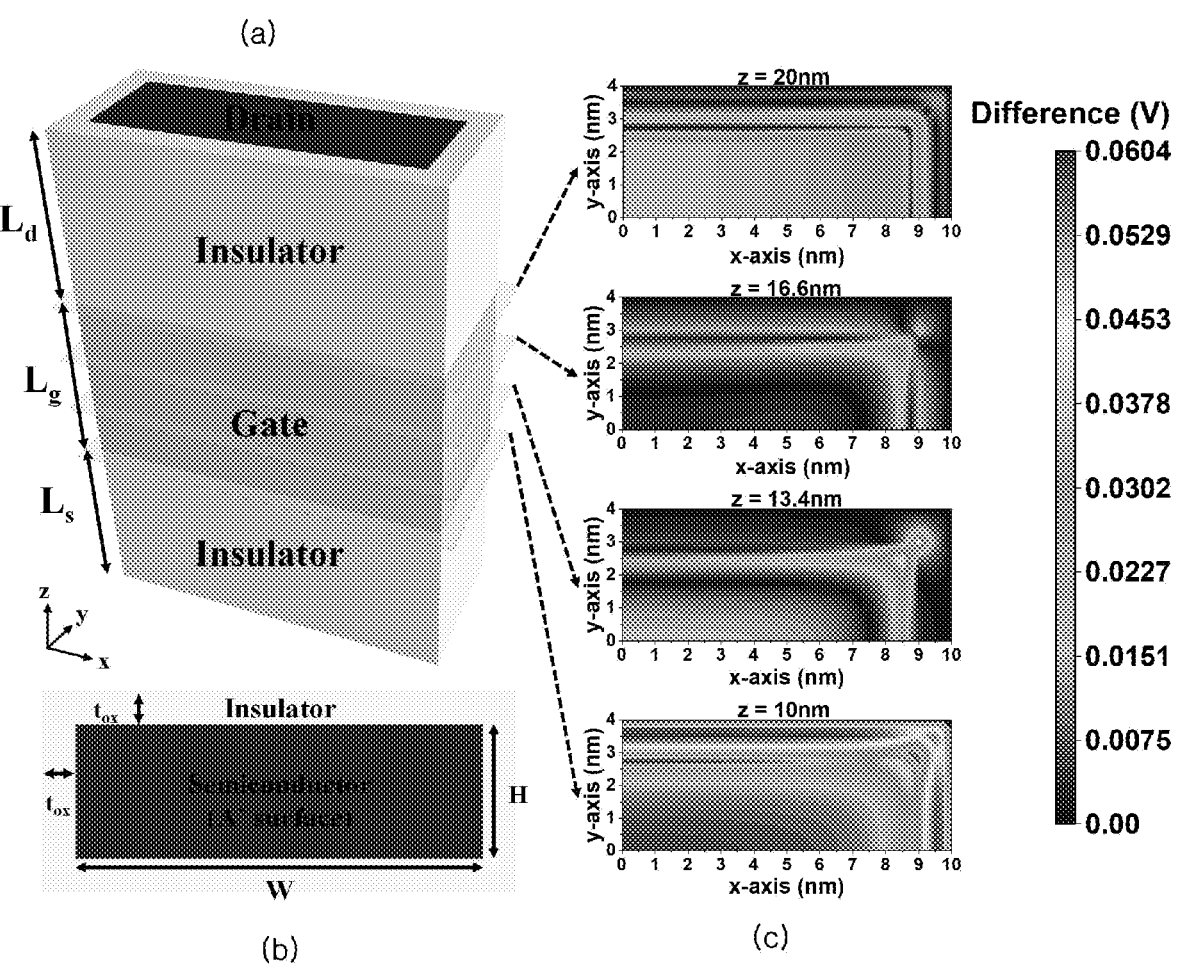
In FIG. 4, (a) is a perspective view showing the structure of a 3D device to which a pseudo 1D model according to the preferred embodiment of the present invention is applied, (b) is a cross-sectional view of the 3D device, and (c) are schematic diagrams showing the difference between the initial guess and the converged solution for each position in the xy direction by color-coding for four 2D sections along the 1D channel direction.

In FIG. 4, (a) is a perspective view showing the structure of a 3D device to which a pseudo 1D model according to the preferred embodiment of the present invention is applied, (b) is a cross-sectional view of the 3D device, and (c) are schematic diagrams showing the difference between the initial guess and the converged solution for each position in the x-y plane by color-coding for four 2D cross sections along the 1D channel direction.

Referring to FIG. 4, in the device structure shown in (a) of FIG. 4, the z-axis represents a direction in which current flows from a source to a drain, that is, a 1D direction for a channel. (b) of FIG. 4 shows a 2D cross section in the x-y plane perpendicular to the z axis. In (a) and (b) of the FIG. 4, the drain is a semiconductor region, the insulator is an insulator region, the gate is a metal region, and the 2D cross section has a structure in which the semiconductor is covered by the insulator. (c) of FIG. 4 are schematic diagrams showing the difference between the initial guess of the potential obtained using the pseudo 1D model according to the present invention and the converged solution of the potential actually obtained through the actual 3D device simulation for four 2D cross sections along the 1D channel direction of the semiconductor device.

Referring to FIG. 4, the maximum value of the difference between the initial guess of the potential obtained numerically using the pseudo 1D model according to the present invention and the actual converged solution for the 1D channel direction is about 0.06V, which is very small. Accordingly, it can be seen that the initial guess according to the present invention has been generated very well and can be applied even when the channel length is extremely short, such as 10 nm.

Figure 5:
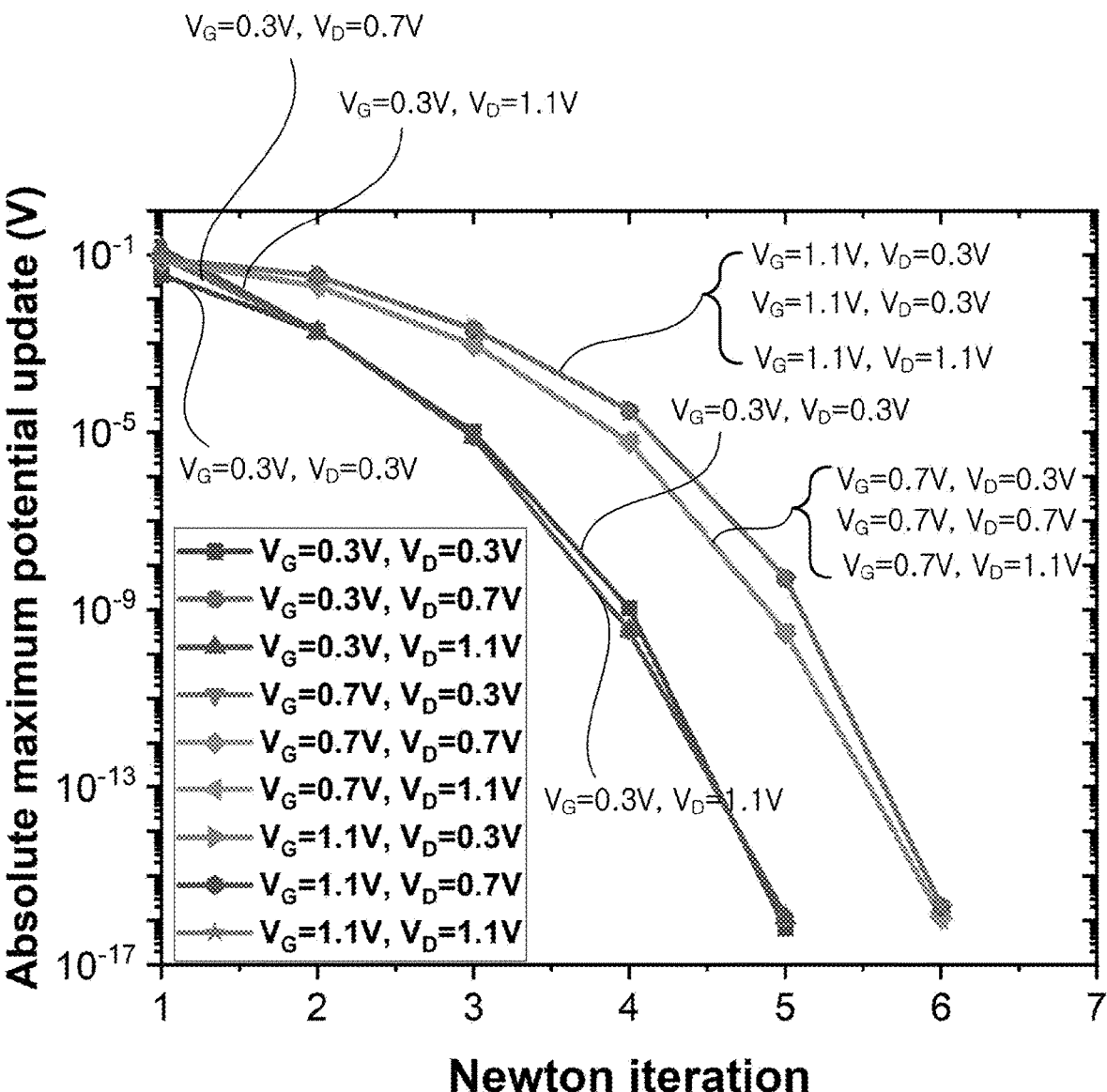
FIG. 5 is a graph shown to explain performance when a semiconductor device is simulated using an initial guess generated by the method for generating an initial guess according to the preferred embodiment of the present invention.

FIG. 5 is a graph shown to explain performance of the semiconductor device simulation according to the preferred embodiment of the present invention. In FIG. 5, the x-axis represents the number of calculation iterations, and the y-axis represents the error, and when 5 to 6 calculation iterations are performed, the error is greatly reduced to the level of $10^{-17}$ V.

When the initial guesses obtained using the pseudo 1D model according to the present invention are applied to various voltage conditions, as shown in FIG. 5, the error (y-axis) is greatly reduced with only a few iterations of calculation, and a numerical solution can be obtained. Here, the various voltage conditions may include, for example, the gate voltage and the drain voltage. In the case of using the conventional initial guess generating method, tens to hundreds of iterative calculations are required to obtain the same solution, whereas the method according to the present invention can obtain the solution with only several iterative calculations. Accordingly, when generating the initial guess for semiconductor device simulation according to the present invention, the simulation speed can be accelerated by reducing the number of calculation iterations.

In the above, the present invention has been mainly described with respect to preferred embodiments thereof, but this is merely an example and does not limit the present invention. Those of ordinary skill in the art to which the present invention pertains will appreciate that various modifications and applications not exemplified above are possible without departing from the essential features of the present invention. And, the differences related to these modifications and applications should be interpreted as being included in the scope of the present invention defined in the appended claims.

What is claimed is:

1. Method of obtaining an initial guess for a semiconductor device simulation comprising the following steps:

(a) setting one-dimensional (1D) direction for a three-dimensional (3D) semiconductor device to be simulated, and setting two-dimensional (2D) cross sections perpendicular to the 1D direction;

(b) setting a charge intensity-gate voltage model for the 2D cross sections;

(c) numerically solving an electron or hole continuity equation along the 1D direction to detect integrated electron charge density and quasi-Fermi potential for the 2D cross sections along the 1D direction; and (d) calculating a physical quantity for each position of the 2D cross sections by applying the integrated electron charge density and the quasi-Fermi potential for the 2D cross sections to the charge density-gate voltage model, and providing the calculated physical quantity as the initial guess for the semiconductor device simulation,

7 wherein the physical quantity for the 3D semiconductor device is provided as the initial guess.

2. The method of obtaining an initial guess for a semiconductor device simulation according to claim 1, wherein the 1D direction is a longitudinal direction of a channel of the semiconductor device, and the 2D cross sections are cross sections of the channel in the longitudinal direction of the channel.

3. The method of obtaining an initial guess for a semiconductor device simulation according to claim 1, wherein the physical quantity includes an electrostatic potential, a concentration of electrons or holes, or both an electrostatic potential and a concentration of electrons or holes.

4. The method of obtaining an initial guess for a semiconductor device simulation according to claim 1, wherein the charge intensity-gate voltage model is determined according to a structure of the 2D cross section, a shape of the channel provided on the 2D cross section, or the type of the 3D semiconductor device.

5. A non-transitory computer-readable and non-volatile storage device recording a program that implement the method of obtaining an initial guess for a semiconductor device simulation according to claim 1, so as to be executable by a processor of a computing apparatus for simulating a semiconductor device.

6. A non-transitory computer-readable and non-volatile storage device recording a program that implement the method of obtaining an initial guess for a semiconductor device simulation according to claim 2, so as to be executable by a processor of a computing apparatus for simulating a semiconductor device.

7. A non-transitory computer-readable and non-volatile storage device recording a program that implement the method of obtaining an initial guess for a semiconductor device simulation according to claim 3, so as to be executable by a processor of a computing apparatus for simulating a semiconductor device.

8. A non-transitory computer-readable and non-volatile storage device recording a program that implement the method of obtaining an initial guess for a semiconductor device simulation according to claim 4, so as to be executable by a processor of a computing apparatus for simulating a semiconductor device.

* * * * *